(12) United States Patent
Xu et al.

(10) Patent No.: US 10,108,042 B2
(45) Date of Patent: Oct. 23, 2018

(54) DISPLAY SUBSTRATE AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Yubo Xu, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 128 days.

(21) Appl. No.: 14/429,096

(22) PCT Filed: Jun. 27, 2014

(86) PCT No.: PCT/CN2014/080914
§ 371 (c)(1),
(2) Date: Mar. 18, 2015

(87) PCT Pub. No.: WO2015/113371
PCT Pub. Date: Aug. 6, 2015

(65) Prior Publication Data
US 2016/0223856 A1 Aug. 4, 2016

(30) Foreign Application Priority Data
Jan. 29, 2014 (CN) .......................... 2014 1 0043952

(51) Int. Cl.
*G02F 1/1335* (2006.01)
*G02F 1/1343* (2006.01)

(52) U.S. Cl.
CPC .. *G02F 1/133514* (2013.01); *G02F 1/134309* (2013.01); *G02F 2001/134345* (2013.01); *G02F 2201/52* (2013.01)

(58) Field of Classification Search
CPC ......... G02F 1/133514; G02F 1/134309; G02F 2001/134345; G02F 2001/136222;
(Continued)

(56) References Cited

U.S. PATENT DOCUMENTS

2004/0046725 A1 3/2004 Lee
2010/0284052 A1* 11/2010 Hsiao ................. G02B 5/201
359/259

(Continued)

FOREIGN PATENT DOCUMENTS

CN 101349845 A 1/2009
CN 101893780 A 11/2010
(Continued)

OTHER PUBLICATIONS

Definition of "stripe" provided by Oxford Living Dictionaries at https://en.oxforddictionaries.com/definition/definition/us/stripe. Definition downloaded on Apr. 5, 2017.*

(Continued)

*Primary Examiner* — Angela Davison
(74) *Attorney, Agent, or Firm* — Ladas & Parry LLP; Loren K. Thompson

(57) ABSTRACT

A display substrate and a display apparatus are disclosed. The display substrate includes a base substrate and a plurality of pixel units sequentially arranged on the base substrate, each of the pixel units includes a plurality of color sub-pixels; part of or all of the color sub-pixels are provided with white light-transmitting regions. Since the transmittance of the white light-transmitting regions is higher than that of the color sub-pixels, the transmittance of the display (Continued)

substrate is effectively improved by providing the white light-transmitting regions in the color sub-pixels, so that the transmittance of the display apparatus is also improved.

13 Claims, 5 Drawing Sheets

(58) Field of Classification Search
CPC ......... G02F 2201/52; G02B 5/22; G02B 5/26; G02B 5/201; G02B 5/223
USPC .......................................... 349/106, 108, 109
See application file for complete search history.

(56) References Cited

U.S. PATENT DOCUMENTS

| | | | |
|---|---|---|---|
| 2012/0206512 A1* | 8/2012 | Kim | G02F 1/133514 345/691 |
| 2012/0287382 A1* | 11/2012 | Qi | G02F 1/133512 349/106 |

FOREIGN PATENT DOCUMENTS

| | | |
|---|---|---|
| CN | 102636894 A | 8/2012 |
| CN | 102944952 A | 2/2013 |
| CN | 103645584 A | 3/2014 |
| CN | 103792724 A | 5/2014 |
| CN | 103809323 A | 5/2014 |
| KR | 101067555 B1 | 9/2011 |

OTHER PUBLICATIONS

Second Chinese Office Action dated Apr. 13, 2016; Appln. No. 201410043952.1.
International Search Report Appln. No. PCT/CN2014/080914; dated Nov. 19, 2014.
Written Opinion of the International Searching Authority Appln. No. PCT/CN2014/080914; dated Nov. 19, 2014.
First Chinese Office Action Appln. No. 201410043952.1; dated Nov. 13, 2015.
Third Chinese Office Action dated Sep. 20, 2016; Appln. No. 201410043952.1.

* cited by examiner

DISPLAY SUBSTRATE AND DISPLAY APPARATUS

TECHNICAL FIELD

Embodiments of the present invention relate to a display technology, particularly, relate to a display substrate and a display apparatus.

BACKGROUND

Liquid crystal displays are most common flat panel displays, and thin film transistor liquid crystal displays (TFT-LCDs) are mainstream products of the liquid crystal displays. A display apparatus is an important component in a liquid crystal display, and is formed by disposing an array substrate and a color filter substrate opposite to each other in a cell-assembling process and providing a liquid crystal layer between the array substrate and the color filter substrate.

FIG. 1 is a schematic structure view of a color filter substrate. As shown in FIG. 1, the color filter includes a black matrix 10, and a red sub-pixel 11, a green sub-pixel 12 and a blue sub-pixel 13 arranged sequentially. Color sub-pixels are arranged on the color filter substrate in three primary color (i.e., red, green, and blue) manner, so that an image is displayed on the display apparatus.

However, the transmittance of red, green, and blue colors is relatively low, so the transmittance of each of the red sub-pixel 11, the green sub-pixel 12 and the blue sub-pixel 13 is below 30%, resulting in a low transmittance of the display apparatus as a whole.

SUMMARY

Embodiments of the present invention provide a display substrate and a display apparatus, the transmittance of which is improved.

At least one embodiment of the present invention provides a display substrate, which comprises a base substrate and a plurality of pixel units sequentially arranged on the base substrate, each of the pixel units comprises a plurality of color sub-pixels, and part of or all of the color sub-pixels are provided with white light-transmitting regions.

Alternatively, the color sub-pixels comprise red sub-pixels, green sub-pixels, or blue sub-pixels; each of the pixel units comprises a red sub-pixel, a green sub-pixel, and a blue sub-pixel and at least one of the red sub-pixel, the green sub-pixel, and the blue sub-pixel is provided with the white light-transmitting region.

Alternatively, in one embodiment, all of the red, green and blue sub-pixels in a part of the pixel units are provided with the white light-transmitting regions.

Alternatively, in one embodiment, the blue sub-pixels in part of the pixel units are provided with the white light-transmitting regions.

Alternatively, in one embodiment, when two or more color sub-pixels of a same pixel unit are provided with the white light-transmitting regions, the white light-transmitting regions in the two or more color sub-pixels of the same pixel unit do not overlap with each other in a direction of arranging the color sub-pixels.

Alternatively, in one embodiment, the white light-transmitting regions are provided as stripe regions disposed in the direction of arranging the color sub-pixels.

Alternatively, in one embodiment, the white light-transmitting regions are provided as stripe regions inclined to the direction of arranging the color sub-pixels.

Alternatively, in one embodiment, in the direction that is perpendicular to the direction of arranging the color sub-pixels, a size of the white light-transmitting region is smaller than or equal to one third of the color sub-pixel correspondingly but larger than 0.

Alternatively, in one embodiment, the white light-transmitting regions are vacant regions formed in a color filter layer of the color sub-pixels.

At least one embodiment of the present invention also provides a display apparatus, which comprises a display substrate and a cell-assembling substrate which are opposite to each other, the display substrate is any one of the above described display substrates.

DETAILED DESCRIPTION

Hereinafter, in order to better understand the solutions of the present invention by those skilled in the art, a display substrate, a method for manufacturing the same, and a display apparatus provided in embodiments of the present invention will be described in detail, in connection with the drawings.

Figure 1:
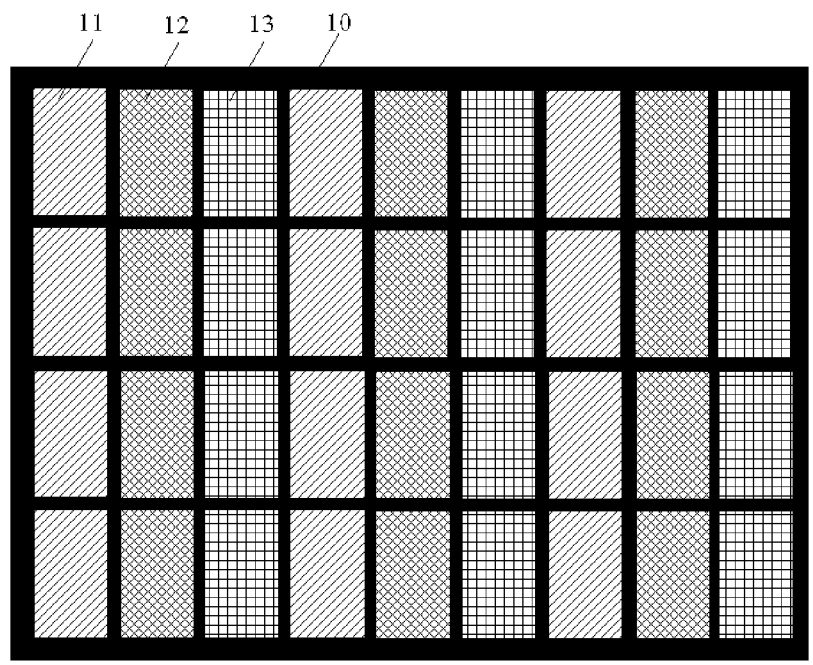
FIG. 1 is a schematic structure view of a color filter substrate.
Figure 2:
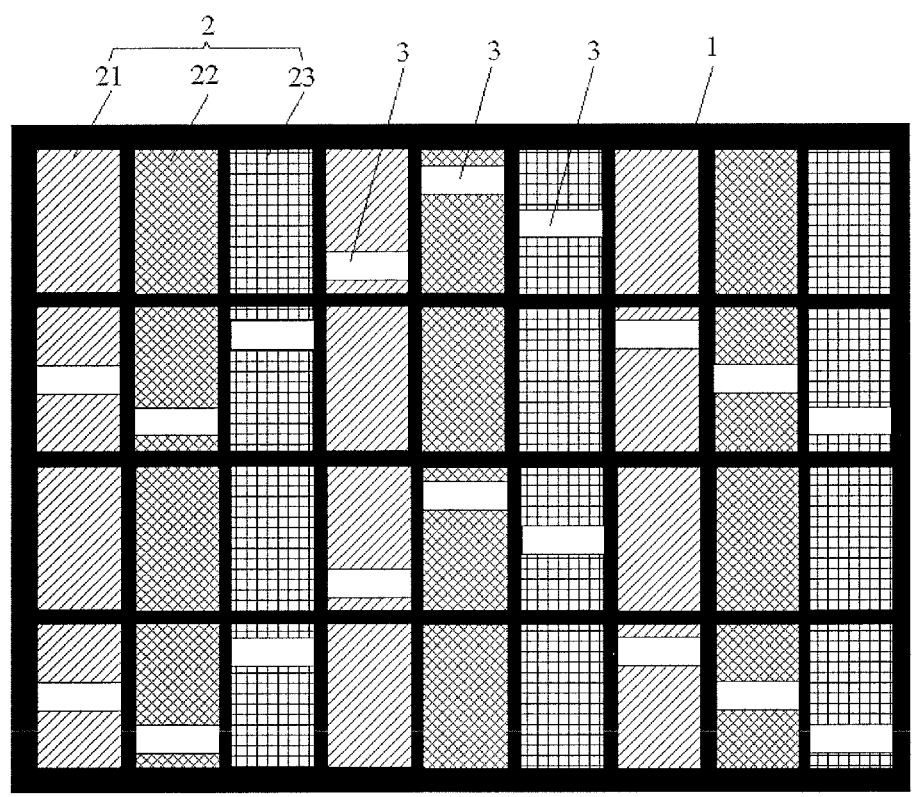
FIG. 2 is a schematic structure view of a display substrate provided in a first embodiment of the present invention.

FIG. 2 is a schematic structure view of a display substrate provided in a first embodiment of the present invention. As shown in FIG. 2, the display substrate includes a base substrate and a plurality of pixel units 2 arranged sequentially on the base substrate. Each pixel unit 2 includes a plurality of color sub-pixels, and part of or all of the color sub-pixels are provided with white light-transmitting regions 3.

The color sub-pixels include red sub-pixels 21, green sub-pixels 22 or blue sub-pixels 23. For example, each pixel unit 2 includes a red sub-pixel 21, a green sub-pixel 22 and a blue sub-pixel 23. The red sub-pixels 21, the green sub-pixels 22 and the blue sub-pixels 23 are repeatedly arranged in this order. It should be understood that the red sub-pixels 21, the green sub-pixels 22 and the blue sub-pixels 23 also can be arranged in other kinds of order, which are not illustrated herein. In addition, the color sub-pixels also can employ sub-pixels in other colors (e.g., cyan sub-pixels, magenta sub-pixels, yellow sub-pixels), which are not illustrated herein. At least one of the red, green and blue sub-pixels 21, 22 and 23 is provided with a white light-transmitting region 3. In the present embodiment, the transmittance of the color sub-pixels is below 30%, while the transmittance of the white light-transmitting region 3 approaches to 100%. Thus, the transmittance of the display substrate is effectively improved by providing the white light-transmitting regions in the color sub-pixels.

In the present embodiment, in a part of the pixel units 2, all of the red, green and blue sub-pixels 21, 22 and 23 are provided with the white light-transmitting regions 3. As shown in FIG. 2, in every other pixel unit 2, all of the red, green and blue sub-pixels 21, 22 and 23 in a pixel unit are provided with the white light-transmitting regions 3. For example, in the first row of pixels, no white light-transmitting region is provided in the first pixel unit 2, and the white light-transmitting region 3 is provided in each of the red, green and blue sub-pixels 21, 22 and 23 of the second pixel unit 2; in the second row of pixels, the white light-transmitting region 3 is provided in each of the red, green and blue sub-pixels 21, 22 and 23 of the first pixel unit 2, and no white light-transmitting region 3 is provided in the second pixel unit 2. The rest pixel units of each row as well as the pixel units for the rest pixels are also provided with the white light-transmitting regions in the same manner as the above described, so the detail description is omitted. In part of the pixel units 2 but not all of the pixel units 2, the white light-transmitting regions are provided in the color sub-pixels, so the transmittance of the display substrate can be improved while the quality of the displayed images can be effectively ensured.

In a process of displaying images, a red brightness signal corresponding to the red sub-pixel 21, a green brightness signal corresponding to the green sub-pixel 22 and a blue brightness signal corresponding to the blue sub-pixel 23 are processed, e.g., a voltage signal supplied to a sub-pixel may be properly raised up or lowered down according to the ratio of the area of the white light-transmitting region to the area of the sub-pixel, so that a gray level of the sub-pixel can be raised up or lowered down, and the color gamut of the color sub-pixels that provided with the white light-transmitting region may become wider.

As an alternative solution, the white light-transmitting regions 3 are provided in the red, green and blue sub-pixels 21, 22 and 23 in all of the pixel units 2, which is not shown in the drawings. In practice, the number and positions of the white light-transmitting regions can be designed based on the desired color scheme in order to improve the transmittance of the display substrate and ensure the quality of the displayed images.

Alternatively, if two or more color sub-pixels of each pixel unit 2 are provided with the white light-transmitting regions 3, the white light-transmitting regions 3 of the different color sub-pixels of the same pixel unit 2 do not overlapped with each other in a direction of arranging the different color sub-pixels. In the present embodiment, the white light-transmitting region 3 is provided in each of the red, green and blue sub-pixels 21, 22 and 23 in part of the pixel units 2, so the white light-transmitting regions 3 of the three color sub-pixels in the part of the pixel units 2 do not overlapped with each other in the direction of arranging the three color sub-pixels. That is to say, in one pixel unit 2, the white light-transmitting regions 3 of different color sub-pixels are staggered with respect to each other in the direction of arranging the color sub-pixels. As shown in FIG. 2, in one pixel unit 2, the white light-transmitting region 3 of the red sub-pixel 21, the white light-transmitting region of the green sub-pixel 22, and the white light-transmitting region of the blue sub-pixel 23 do not overlapped with each other in the direction of arranging these different sub-pixels (e.g., the horizontal direction in FIG. 2). It is avoided to form a continuous white light-transmitting region in the direction of arranging the different color sub-pixels by arranging the white light-transmitting regions 3 of the different color sub-pixels of the pixel units to be not overlapped with each other in the direction of arranging the different color sub-pixels, and thus the occurrence of white lines in the displayed image is also avoided.

In the present embodiment, the white light-transmitting regions 3 are provided as stripe regions disposed in the direction of arranging the color sub-pixels. Alternatively, the white light-transmitting regions 3 also can be formed in other shapes.

The size of the white light-transmitting regions 3 can be adjusted according to demand. For example, the size of the white light-transmitting regions 3 is smaller than or equal to one third of the size of the color sub-pixel but larger than zero (0) in the direction that is perpendicular to the direction of arranging the color sub-pixels. It is effectively avoided to form a continuous white light-transmitting region in the direction of arranging the color sub-pixels by providing the white light-transmitting regions 3 with such a size, and thus the occurrence of white lines in the displayed image is also avoided.

In the present embodiment, the white light-transmitting regions 3 are vacant (opening) regions formed in the color filter layer of the color sub-pixels.

Alternatively, in the present embodiment, the display substrate also may include a black matrix 1 formed on the base substrate.

In the present embodiment, for example, the display substrate may be a color filter substrate.

In the display substrate provided in the present embodiment, each pixel unit includes a plurality of color sub-pixels, and part of or all of the color sub-pixels are provided with white light-transmitting regions. Since the transmittance of the white light-transmitting regions is higher than that of the color sub-pixels, the transmittance of the display substrate is effectively improved by providing the white light-transmitting regions in the color sub-pixels, so that the transmittance of the display apparatus is also improved. The white light-transmitting regions are disposed within the color sub-pixels, so compared with a solution of providing independent white sub-pixels, the present embodiment can enhance the transmittance without using independent white sub-pixels, so that there is no need to change the design of the current display apparatus, and the manufacture process is simple and is easy to be implemented. Since the present embodiment can improve the transmittance of the display apparatus, in the case where the integral brightness of the display apparatus of the present embodiment is maintained to be same as that of a present display apparatus, the emitting brightness of the backlight source can be reduced.

Figure 3:
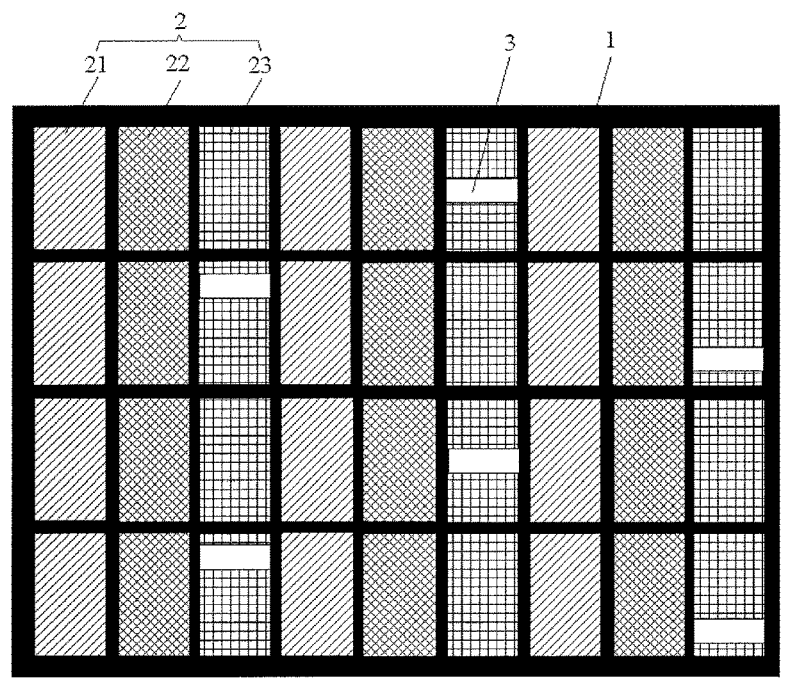
FIG. 3 is a schematic structure view of a display substrate provided in a second embodiment of the present invention.

FIG. 3 is a schematic structure view of a display substrate provided in a second embodiment of the present invention. As shown in FIG. 3, the display substrate includes a base substrate, a plurality of pixel units 2 are formed on the base substrate and arranged sequentially, each pixel unit 2 includes a plurality of color sub-pixels, and part of or all of the color sub-pixels are provided with white light-transmitting regions.

The color sub-pixels include red sub-pixels 21, green sub-pixels 22 or blue sub-pixels 23. For example, each pixel unit 2 includes a red sub-pixel 21, a green sub-pixel 22 and a blue sub-pixel 23. The red sub-pixels 21, the green sub-pixels 22 and the blue sub-pixels 23 are repeatedly arranged in this order. It should be understood that the red sub-pixels 21, the green sub-pixels 22 and the blue sub-pixels 23 also can be arranged in the pixel units 2 in other kinds of orders, which are not illustrated herein. In addition, the color sub-pixels also can employ sub-pixels having other colors, which are not illustrated herein. At least one of the red, green and blue sub-pixels 21, 22 and 23 is provided with a white light-transmitting region 3.

The blue sub-pixels 23 in part of the pixel units 2 are provided with the white light-transmitting regions 3. As shown in FIG. 3, in every other pixel unit 2, the blue sub-pixels 23 are correspondingly provided with the white light-transmitting regions 3. For example, in the first row of pixels, no white light-transmitting region is provided in the first pixel unit 2, and the white light-transmitting region 3 is provided in the blue sub-pixel 23 of the second pixel unit 2; in the second row of pixels, the white light-transmitting region 3 is provided in the blue sub-pixel 23 of the first pixel unit 2, and no white light-transmitting region 3 is provided in the second pixel unit 2. The rest pixel units of each row as well as the pixel units for the rest pixels are also provided with the white light-transmitting region in the same manner as the above described, so the detail description is omitted. In part of the pixel units 2 but not all of the pixel units 2, the white light-transmitting regions are provided in the blue sub-pixels, so the transmittance of the display substrate can be improved while the quality of the displayed images can be effectively ensured.

In the present embodiment, the white light-transmitting regions 3 are provided as stripe regions disposed in the direction of arranging the color sub-pixels. Alternatively, the white light-transmitting regions 3 also can be formed in other shapes.

The size of the white light-transmitting regions 3 can be adjusted according to demand. For example, the size of the white light-transmitting regions 3 is smaller than or equal to one third of the color sub-pixel but larger than zero (0) in the direction that is perpendicular to the direction of arranging the color sub-pixels.

As an alternative solution, the blue sub-pixels 23 in all of the pixel units 2 are provided with the white light-transmitting region 3, which is not shown in the drawings.

As an alternative solution, the red sub-pixels 21 in part of or all of the pixel units 2 are provided with the white light-transmitting region 3, which is not shown in the drawings.

As an alternative solution, the green sub-pixels 22 in part of or all of the pixel units 2 are provided with the white light-transmitting region 3, which is not shown in the drawings.

As an alternative solution, at least any two of the red sub-pixels 21, the green sub-pixels 22, and the blue sub-pixels 23 in part of or all of the pixel units 2 are provided with the white light-transmitting region 3, which is not shown in the drawings.

In practice, the number and positions of the white light-transmitting regions can be designed based on the desired color scheme, in order to improve the transmittance of the display substrate and ensure the quality of the displayed images.

In the present embodiment, the white light-transmitting regions 3 are vacant (opening) regions formed in the color filter layer of the color sub-pixels.

Alternatively, in the present embodiment, the display substrate also may include a black matrix 1 that is formed on the base substrate.

In the present embodiment, for example, the display substrate may be a color filter substrate.

In the display substrate provided in the present embodiment, each pixel unit includes a plurality of color sub-pixels, and part of or all of the color sub-pixels are provided with white light-transmitting regions. Since the transmittance of the white light-transmitting regions is higher than that of the color sub-pixels, the transmittance of the display substrate is effectively improved by providing the white light-transmitting regions in the color sub-pixels, so that the transmittance of the display apparatus is also improved. The white light-transmitting regions are disposed within the color sub-pixels, so compared with a solution of providing independent white sub-pixels, the present embodiment can enhance the transmittance without using independent white sub-pixels, so that there is no need to change the design of the current display apparatus, and the manufacture process is simple and is easy to be implemented. Since the present embodiment can improve the transmittance of the display apparatus, when the integral brightness of the display apparatus of the present embodiment is maintained to be same as that of the current display apparatus, the emitting brightness of the backlight source can be reduced.

Figure 4:
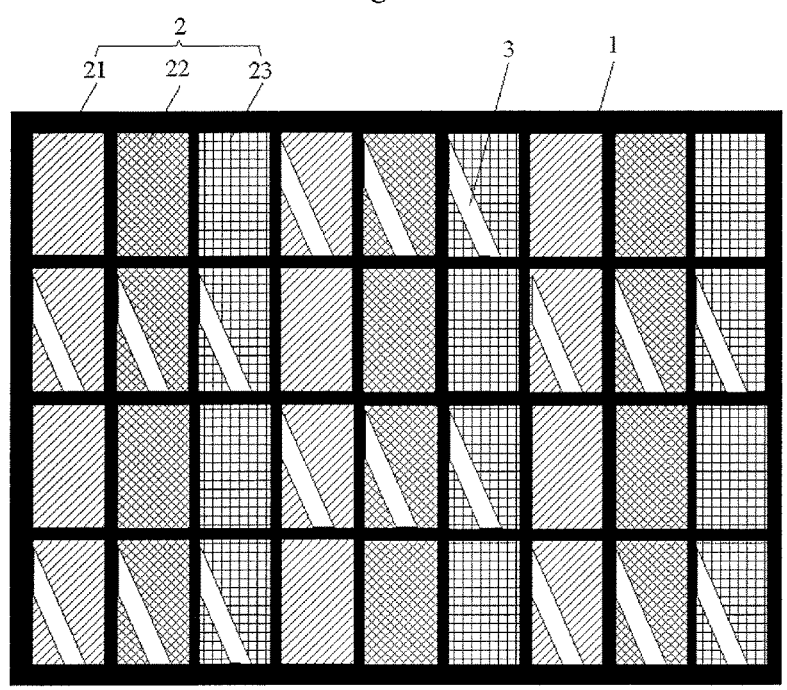
FIG. 4 is a schematic structure view of a display substrate provided in a third embodiment of the present invention.

FIG. 4 is a schematic structure view of a display apparatus provided in a third embodiment of the present invention. As shown in FIG. 4, the difference between the display apparatus in the present embodiment and that in the first embodiment described as above lies in that: the white light-transmitting regions 3 are provided as stripe regions inclined to the direction of arranging the color sub-pixels.

In the present embodiment, since the white light-transmitting regions are provided as stripe regions inclined to the direction of arranging the color sub-pixels, it is effectively avoided to form a continuous white light-transmitting region by providing the white light-transmitting regions in the color sub-pixels, and thus the occurrence of white lines in the displayed image is also avoided.

A fourth embodiment of the present invention provides a display apparatus including a display substrate and a cell-assembling substrate which are provided opposite to each other. A liquid crystal layer is provided between the display substrate and the cell-assembling substrate. The display substrate may employ the display substrate in the first, second or third embodiment.

For example, the display substrate is a color filter substrate, and the cell-assembling substrate is an array substrate.

For example, the display substrate also may be a color filter on array (COA) substrate, while the cell-assembling substrate is a glass substrate.

Alternatively, the display substrate is a COA substrate in which a black matrix and a plurality of pixel units arranged sequentially are formed on a front face of a base substrate while the structures included in the original array substrate are formed on a rear face of the base substrate. That is, the COA substrate may be formed by disposing the established color filter substrate and the established array substrate on the front face and the rear face of the base substrate respectively, and thus the cell-assembling substrate is the glass substrate.

In the display substrate provided in the present embodiment, each pixel unit includes a plurality of color sub-pixels, and part of or all of the color sub-pixels are provided with white light-transmitting regions. Since the transmittance of the white light-transmitting regions is higher than that of the color sub-pixels, the transmittance of the display substrate is effectively improved by providing the white light-transmitting regions in the color sub-pixels, so that the transmittance of the display apparatus is also improved. The white light-transmitting regions are disposed within the color sub-pixels, so compared with a solution of providing independent white sub-pixels, the present embodiment can enhance the transmittance without using independent white sub-pixels, so that there is no need to change the design of the current display apparatus, and the manufacture process is simple and is easy to be implemented. Since the present embodiment can improve the transmittance of the display apparatus, when the integral brightness of the display apparatus of the present embodiment is maintained to be same as that of the current display apparatus, the emitting brightness of the backlight source can be reduced.

Figure 5:
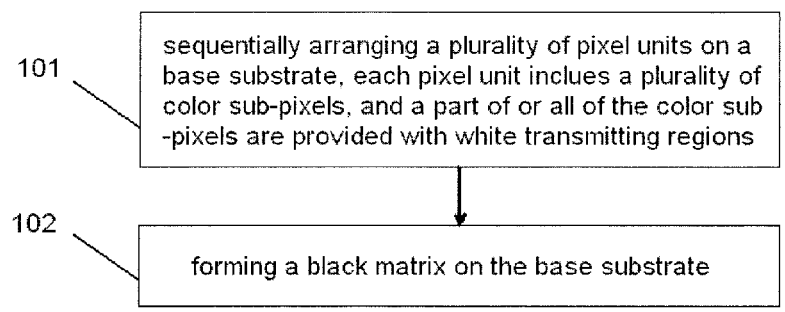
FIG. 5 is a flow diagram of a method for manufacturing a display substrate provided in a fifth embodiment of the present invention.

FIG. 5 is a flow diagram of a method for manufacturing a display substrate provided in a fifth embodiment of the present invention. As shown in FIG. 5, the method includes the following steps.

In step 101, a plurality of pixel units are formed on the base substrate and arranged sequentially. Each pixel unit includes a plurality of color sub-pixels, and part of or all of the color sub-pixels are provided with white light-transmitting regions.

The color sub-pixels include red sub-pixels, green sub-pixels or blue sub-pixels. For example, each pixel unit includes a red sub-pixel, a green sub-pixel and a blue sub-pixel. At least one of the red, green and blue sub-pixels is provided with a white light-transmitting region. In the present embodiment, all of the red, green and blue sub-pixels in part of the pixel units are provided with the white light-transmitting regions. In detail, the step 101 may includes the following steps.

Step 1011, forming red sub-pixels on the base substrate by a patterning process.

Figure 6A:
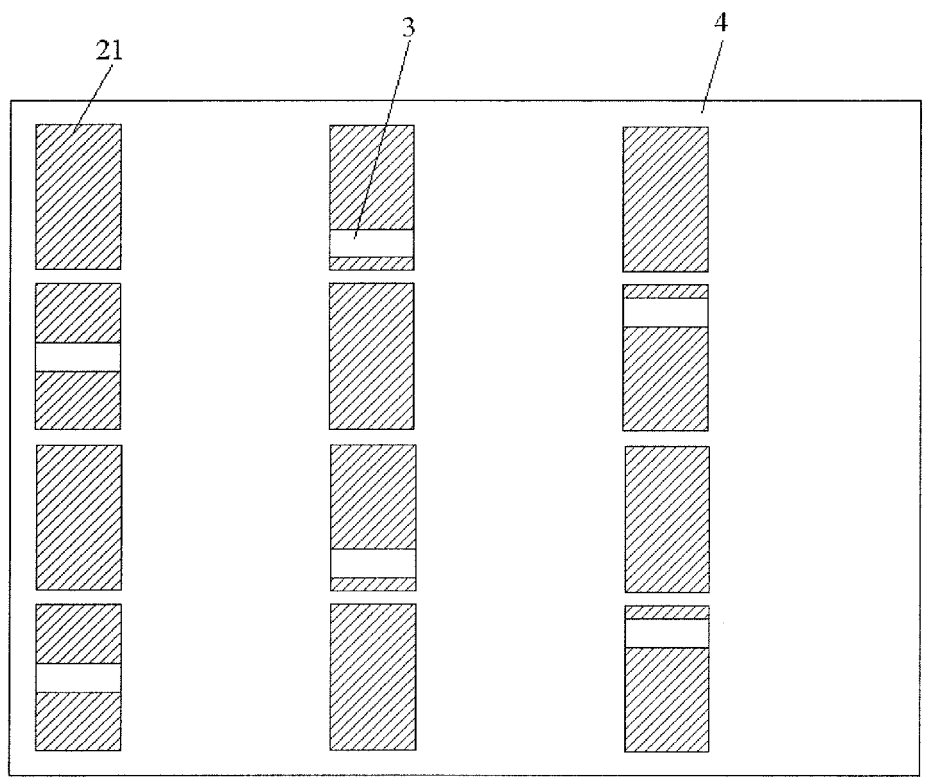
FIG. 6a is a schematic view of forming red sub-pixels in the fifth embodiment.

FIG. 6a is a schematic view of the red sub-pixels formed in the fifth embodiment. As shown in FIG. 6a, the red sub-pixels 21 are formed on the base substrate 4 by the patterning process, and part of the red sub-pixels 21 are provided with the white light-transmitting regions 3.

Step 1012, forming green sub-pixels on the base substrate by a patterning process.

Figure 6B:
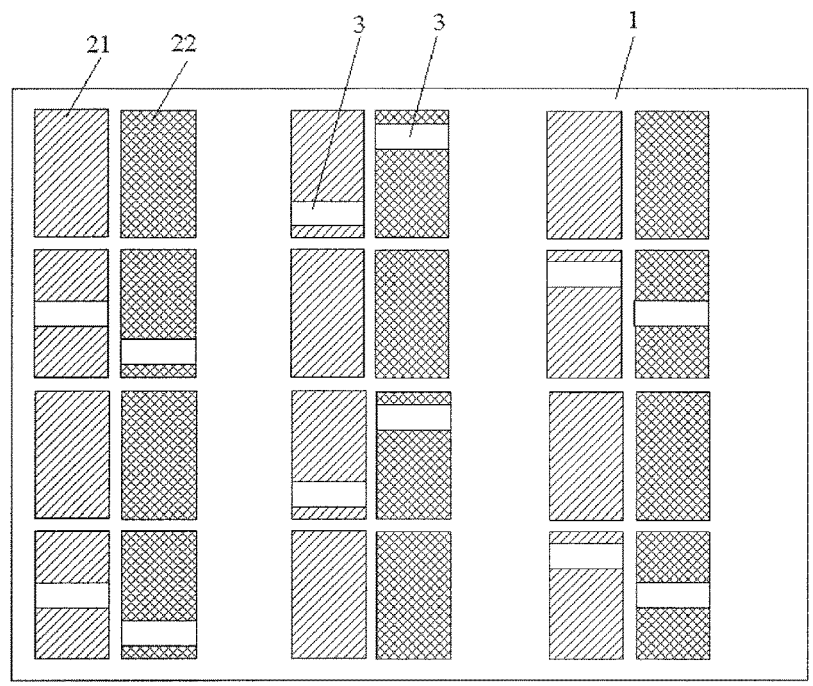
FIG. 6b is a schematic view of forming green sub-pixels in the fifth embodiment.

FIG. 6b is a schematic view of the green sub-pixels formed in the fifth embodiment. As shown in FIG. 6b, the green sub-pixels 22 are formed on the base substrate 4 by the patterning process, and part of the green sub-pixels 22 are provided with the white light-transmitting regions 3.

Step 1013, forming blue sub-pixels on the base substrate by a patterning process.

Figure 6C:
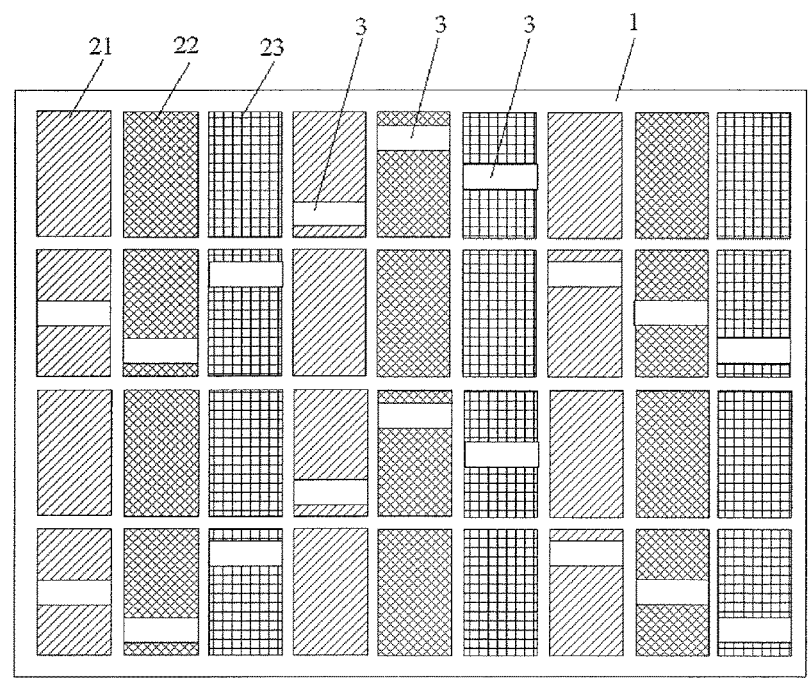
FIG. 6c is a schematic view of forming blue sub-pixels in the fifth embodiment.

FIG. 6c is a schematic view of the blue sub-pixels formed in the fifth embodiment. As shown in FIG. 6c, the blue sub-pixels 23 are formed on the base substrate 4 by the patterning process, and part of the blue sub-pixels 23 are provided with the white light-transmitting regions 3.

In the present embodiment, the order of performing the steps 1011 to 1013 can be changed as desired.

Further, in the present embodiment, the method further includes a step 202 in which a black matrix is formed on the base substrate.

As shown in FIG. 2, the black matrix 1 is formed on the base substrate by a patterning process.

In the present embodiment, the order of performing the steps 101 and 102 can be changed as desired.

In the present embodiment, the patterning process may include photoresist coating, exposing, developing, etching, and removing processes, or the like.

The method for manufacturing the display substrate provided in the present embodiment may be used to produce the display substrate described in the first embodiment, and the detail description of the display substrate is provided in the first embodiment.

Alternatively, the white light-transmitting regions are formed in the blue sub-pixels of part of the pixel units, and the display substrate with such structure is provided in the second embodiment, so the detail description is omitted.

Alternatively, the white light-transmitting regions are provided as stripe regions inclined to the direction of arranging the color sub-pixels, and the display substrate with such a structure is provided in the third embodiment, so the detail description is omitted.

In the display substrate formed by the method provided in the present embodiment, each pixel unit includes a plurality of color sub-pixels, and part of or all of the color sub-pixels are provided with white light-transmitting regions. Since the transmittance of the white light-transmitting regions is higher than that of the color sub-pixels, the transmittance of the display substrate is effectively improved by providing the white light-transmitting regions in the color sub-pixels, so that the transmittance of the display apparatus is also improved. The white light-transmitting regions are disposed within the color sub-pixels, so compared with a solution of providing independent white sub-pixels, the present embodiment can enhance the transmittance without using the separated white sub-pixels, so that there is no need to change the design of the current display apparatus, and the manufacture process is simple and is easy to be implemented. Since the present embodiment can improve the transmittance of the display apparatus, when the integral brightness of the display apparatus of the present embodiment is maintained to be same as that of the current display apparatus, the emitting brightness of the backlight source can be reduced.

The foregoing is merely the exemplary embodiments of the present invention, and is not intended to limit the scope of the present invention. It will be understood by those of ordinary skill in the art that various changes and modifications may be made therein without departing from the spirit and scope of the present invention. These changes and modifications fall within the scope of the present invention.

This application claims priority to Chinese Patent Application No. 201410043952.1, filed on Jan. 29, 2014, filed in the State Intellectual Property Office of the P.R.C, the disclosure of which is incorporated herein in its entirety by reference.

What is claimed is:

1. A display substrate, comprising a base substrate and a plurality of pixel units sequentially arranged on the base substrate, each of the pixel units comprising a plurality of color sub-pixels, the color sub-pixels in each pixel unit being sequentially arranged along a first direction,
   wherein part of or all of the color sub-pixels are provided with white light-transmitting regions,
   three or more color sub-pixels in a same pixel unit are provided with the white light-transmitting regions, projections of the white light-transmitting regions in the three or more color sub-pixels of the same pixel unit do not overlap with each other in the first direction along which the color sub-pixels in each pixel unit are sequentially arranged.

2. The display substrate according to claim 1, wherein the white light-transmitting regions are provided as stripe regions disposed along the first direction.

3. The display substrate according to claim 1, wherein in a second direction that is perpendicular to the first direction, a size of the white light-transmitting region is smaller than or equal to one third of the color sub-pixel correspondingly but larger than 0.

4. The display substrate according to claim 1, wherein the white light-transmitting region is a vacant region formed in a color filter layer of the color sub-pixels.

5. A display apparatus, comprising a display substrate and a cell-assembling substrate which are opposite to each other, wherein the display substrate is formed as the display substrate according to claim 1.

6. The display substrate according to claim 1, wherein the color sub-pixels comprise red sub-pixels, green sub-pixels, or blue sub-pixels, and each of the pixel units comprises a red sub-pixel, a green sub-pixel, and a blue sub-pixel,
wherein in part of the pixel units, the red, green and blue sub-pixels are provided with the white light-transmitting regions.

7. A display substrate, comprising a base substrate and a plurality of pixel units sequentially arranged on the base substrate, each of the pixel units comprising a plurality of color sub-pixels, the color sub-pixels in each pixel unit being sequentially arranged along a first direction,
wherein at least one color sub-pixels of each pixel unit is provided with a white light-transmitting region,
the white light-transmitting region is provided as a straight stripe region, a length direction of the straight stripe region intersects with both the first direction along which the color sub-pixels in each pixel unit are sequentially arranged, and a second direction that is perpendicular to the first direction.

8. The display substrate according to claim 7, wherein in the second direction, a size of the white light-transmitting region is smaller than or equal to one third of the color sub-pixel correspondingly but larger than 0.

9. The display substrate according to claim 7, wherein the white light-transmitting region is a vacant region formed in a color filter layer of the color sub-pixels.

10. The display substrate according to claim 7, wherein the color sub-pixels comprise red sub-pixels, green sub-pixels, or blue sub-pixels, and each of the pixel units comprises a red sub-pixel, a green sub-pixel, and a blue sub-pixel; and
at least one of the red sub-pixel, the green sub-pixel, and the blue sub-pixel is provided with the white light-transmitting region.

11. The display substrate according to claim 10, wherein in part of the pixel units, the red, green and blue sub-pixels are provided with the white light-transmitting region.

12. The display substrate according to claim 10, wherein in part of the pixel units, the blue sub-pixels are provided with the white light-transmitting region.

13. A display apparatus, comprising a display substrate and a cell-assembling substrate which are opposite to each other, wherein the display substrate is formed as the display substrate according to claim 7.

\* \* \* \* \*